United States Patent [19]

Stephens

[11] Patent Number: 5,019,000
[45] Date of Patent: May 28, 1991

[54] METHOD AND APPARATUS FOR PREVENTING EYEGLASSES FROM SINKING IN WATER

[76] Inventor: William H. Stephens, 11841 Kensington Road, Los Alamitos, Calif. 90720

[21] Appl. No.: 395,893

[22] Filed: Aug. 18, 1989

[51] Int. Cl.$^5$ .............................................. B63B 22/16
[52] U.S. Cl. ..................................... 441/006; 351/043
[58] Field of Search ........................... 441/1, 6, 7, 136; 351/41, 43, 52, 123, 157; 2/DIG. 10

[56] References Cited

U.S. PATENT DOCUMENTS

| | | | |
|---|---|---|---|
| 1,902,764 | 3/1933 | Give | 441/136 |
| 4,133,604 | 1/1979 | Fuller | 351/123 |
| 4,696,556 | 9/1987 | Perry | 351/123 |

FOREIGN PATENT DOCUMENTS 829813  1/1952  Fed. Rep. of Germany ........ 351/43

Primary Examiner—Jesus D. Sotelo
Attorney, Agent, or Firm—Charles H. Thomas

[57] ABSTRACT

An eyeglass retainer is provided for holding eyeglasses afloat in the event the eyeglasses accidentally fall into a body of water. The eyeglass retainer is comprised of an elongated, water impervious, resilient hollow flexible tube having open ends which grip the bows of an eyeglass frame and a float in the form of an open celled plastic block having a pair of parallel openings therethrough. The flexible tube is threaded through the openings prior to attachment of the ends of the tube to the eyeglass bows. The block has a buoyancy greater than the weight of the eyeglasses to thereby hold the eyeglasses close to the surface of a body of water.

13 Claims, 1 Drawing Sheet

U.S. Patent
May 28, 1991
5,019,000
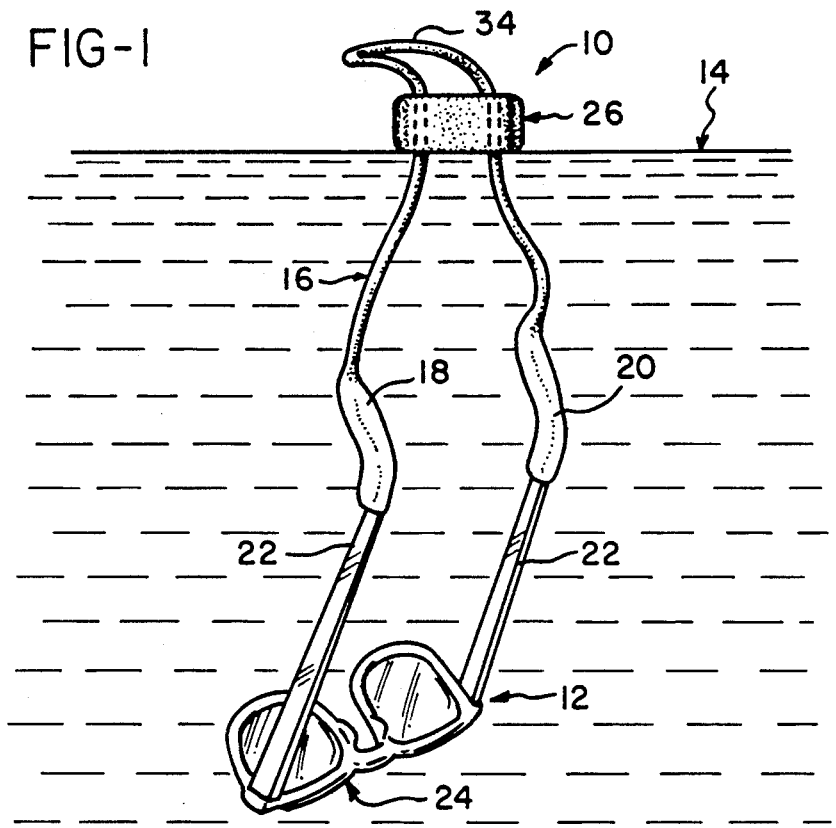
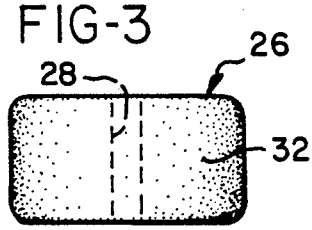
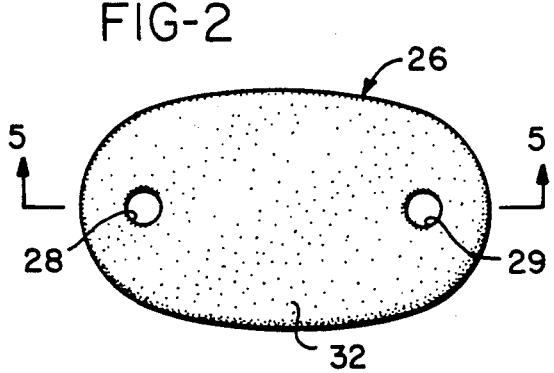
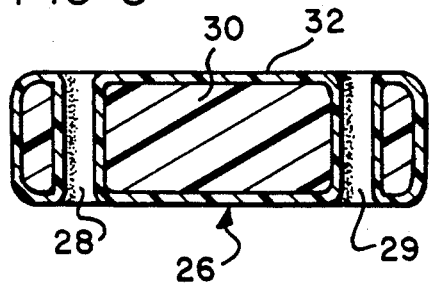
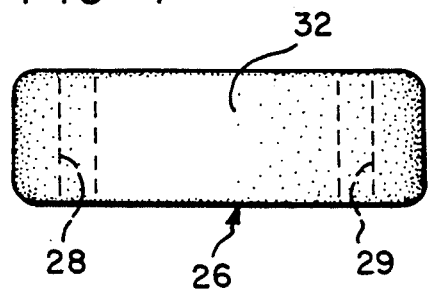

METHOD AND APPARATUS FOR PREVENTING EYEGLASSES FROM SINKING IN WATER

BACKGROUND OF THE INVENTION

1. Field of the Invention

The present invention is directed to a floating eyeglass retainer and a method of preventing eyeglasses from sinking in water.

2. Description of the Prior Art

One continuous hazard which has long existed for people who wear eyeglasses and engage in activities near or upon a body of water is the eve present danger that their eyeglasses will fall into the water and become irretrievably lost. Eyeglasses are formed of glass or plastic lenses which are held within a frame that has a pair of temples extending rearwardly from the lenses. The extremities of the temples remote from the lenses are turned downwardly to form a pair of eyeglass frame bows.

Some people are forced to wear eyeglasses having prescription lenses so as to correct defective vision Other people wear eyeglasses with tinted lenses, such as sunglasses, which may or may not have prescription lenses so as to reduce eyestrain by shading the ambient light and by cutting the glare of the sun on a body of water. In either case the construction of conventional eyeglasses is such that the eyeglasses will promptly sink to the bottom of a body of water if they accidentally fall into the water. Eyeglasses are frequently lost from boats, piers and docks in this manner. The expense of replacing eyeglasses which have sunk irretrievably beneath the surface of a body of water is considerable, both for prescription and nonprescription eyeglasses.

Various eyeglass leashes have been devised to attempt to prevent eyeglasses from inadvertently falling into the water and becoming lost. One type of eyeglass leash employs an elastic band that terminates in plastic fasteners which grip the bows of the eyeglass frame. The elastic band passes around the back of a person's head to hold the eyeglasses in position on a person's face. This type of eyeglass retainer is somewhat uncomfortable, since the elastic band causes the frames of the eyeglasses to be pressed against the nose and forehead of a person's face. Also, the plastic fasteners at the end of the elastic band frequently become brittle with exposure to the sun and will break.

Another type of conventional eyeglass retainer employs an inelastic cord which terminates in loops at both ends that can be cinched about the temples of eyeglass frames. The cord passes loosely about the back of a person's head and does not press the eyeglass frames against the face of the wearer. Yet another type of conventional eyeglass retainer is formed of an elongated, flexible, resilient hollow tube constructed of rubber or neoprene. The ends of the tube are inserted onto the ends of the eyeglass frame bows so that the tube passes about the back of the head of the wearer.

Eyeglasses can still be dislodged from the face of the wearer even if the conventional types of eyeglass retainers are employed. Flapping flags and sails, moving lines and boat rigging and even gusts of wind can cause eyeglasses to be plucked from the face of a wearer and cast into the sea. None of the conventional types of eyeglass retainers will prevent the eyeglasses from thereupon sinking to the bottom of a body of water into which they have fallen.

SUMMARY OF THE INVENTION

One object of the present invention is to provide a means for preventing eyeglasses from sinking to the bottom of a body of water into which they have fallen. Conventional eyeglass retaining systems attempt to prevent the eyeglasses from falling into the water. However, none of the conventional eyeglass retaining leashes can be totally effective in preventing eyeglasses from accidentally becoming dislodged from the face of a wearer. Furthermore, none of the conventional eyeglass retainers which are available allow the eyeglasses to be saved once they have fallen overboard.

A further object of the invention is to provide an eyeglass retaining system which will allow a user to readily adjust the tension with which eyeglasses are held in place when worn. The eyeglass retainers of the invention employ an elongated, hollow resilient flexible tube the ends of which fit onto the ends of the eyeglass frame bows. The tube is threaded through a foam block which not only prevents the eyeglasses from sinking if they fall into the water but also serves as an adjustable cinch which is positioned at the back of the head of the wearer when the eyeglasses are worn. The cinch can be adjusted while the eyeglasses remain in place on the wearer's head, so that the wearer can achieve an optimum force holding the eyeglasses in position. The eyeglasses can thereby be held firmly, but comfortably in place. The eyeglasses are thus less likely to fall into the water, as contrasted with retaining systems which pass loosely behind the head of the wearer. Moreover, since the retainer of the invention can be adjusted while worn, the user is more likely to exert the minimum effort necessary to adjust the retainer to an optimum extent, in contradistinction to retainers which can be adjusted only when removed from the head of the wearer.

In one broad aspect the present invention is a floating eyeglass retainer for holding eyeglasses afloat comprising: an elongated, water impervious resilient hollow flexible tube having open ends adapted to be resiliently deformed for insertion over the bows of a frame for the eyeglasses, and a float defining a pair of openings through which the tube extends to thereby capture the tube an wherein the float has a buoyancy in water sufficient to overcome the weight of the eyeglasses and to remain afloat.

The float is preferably constructed as an elongated block of closed cell plastic foam covered by an oil based vinyl coating. The float is preferably about two and one half inches in length, about one and three eighths inches in width and about three quarters of an inch in thickness. The foam block is preferably provided with a pair of parallel openings therethrough spaced apart a distance of about one and three quarter inches, center to center. Each of the openings is preferably about three sixteenths of an inch in diameter throughout. Such a block of foam is covered by an oil based vinyl coating into which the block is dipped and will exert an upward buoyancy in water of at least about two ounces. This buoyancy is greater than the weight of most eyeglasses, even eyeglasses with heavy frames and thick lenses. The buoyant force of the foam block is aided by the buoyant force equal to the weight of the water displaced by eyeglasses immersed in a body of water.

The resilient, water impervious, hollow tube is preferably comprised of neoprene or rubber and has an outer diameter of about one quarter of an inch and an inner diameter of about one eighth of an inch. The tube is typically between about fourteen and twenty two inches in length. When the tube is threaded through the openings in the foam block, it forms a loop between the openings. The provision of such a loop is advantageous, since the loop can be hooked with relative ease from the deck of a boat or from a pier located some distance above the surface of a body of water. Oftentimes a boat deck or the deck of a pier is located several feet above the surface of a body of water into which eyeglasses accidentally fall. Thus, even though the eyeglasses are held just below the surface of the water by a float according to the invention, there can still be difficulty in retrieving the eyeglasses. By forming a loop through the flat with the length of flexible tubing, one is able to snag or hook the loop from above using some implement, such as a boat hook or a fishing line.

The float is preferably colored very brightly, so that it can be visually located even in very rough seas. For example, the float can be colored a brilliant yellow, pink, chartreuse or orange so as to contrast brightly against the blue-green or grey color of a body of water into which the eyeglasses have fallen.

In another broad aspect the present invention is a method of preventing eyeglasses formed with lenses and with a frame having a pair of bows from sinking in water. According to the method of the invention, an elongated, hollow, water impervious, resilient flexible tube is threaded through a pair of openings defined in a block having a buoyancy in water greater than the weight of water. The ends of the tube are inserted onto the bows, whereby the ends of the tube are elastically deformed to grip the bows. The tube forms a loop between the openings in the buoyant block.

If the eyeglasses should accidentally fall into a body of water, the block will remain floating on the surface of the water with the eyeglasses suspended therebeneath by means of the ends of the tube which grip the eyeglass bows. The weight of the eyeglasses will pull the floating block into an orientation such that the loop at the center of the tube projects upwardly where it can be conveniently hooked so as to lift the eyeglasses from the water.

The floating eyeglass retainers have numerous different applications. They are quite useful while participating in active water sports, such as surfing, sail boating, jet skiing, water skiing, body surfing, skim boarding, and the like. They are also very useful in other water oriented activities, such as power boating, sailing and fishing, as well as in water oriented occupations, such as off shore drilling and boat repair and maintenance.

The invention may be described with greater clarity and particularity with reference to the accompanying drawings.

DESCRIPTION OF THE DRAWINGS

FIG. 1 is an elevational view illustrating the manner in which a preferred embodiment of the floating eyeglass retainer of the invention prevents eyeglasses from sinking in a body of water.

FIG. 2 is a top plan view showing the float in the floating eyeglass retainer of FIG. 1 in isolation.

FIG. 3 is an end view of the float of FIG. 2.

FIG. 4 is a side elevational view of the float of FIG. 2.

FIG. 5 is a sectional elevational view taken along the lines 5—5 of FIG. 2.

DESCRIPTION OF THE EMBODIMENT AND IMPLEMENTATION OF THE METHOD

FIG. 1 illustrates a floating eyeglass retainer indicated generally at 10 holding eyeglasses 12 afloat in a body of water indicated at 14. The floating eyeglass retainer 10 is formed of the combination of an elongated, water impervious, resilient, flexible hollow tube 16 having ends 18 and 20 and a foam block 26. The ends 18 and 20 of the hollow tube 16 are elastically deformable to serve as sleeves to fit over the ends of bows 22 of an eyeglass frame 24 for the eyeglasses 12 to thereby releasably attach the eyeglasses 12 to the tube 16. The block 26 defined a pair of oppenings 28 and 29 therethrough and through which the tube 16 is threaded. The block 26 has a buoyancy in water sufficient to float when the eyeglasses 12 are attached to the tube 16 and immersed in the water 14, as depicted in FIG. 1. The block 26 preferably has a buoyancy of at least about two ounces.

As illustrated in FIGS. 2-5 the float 26 is comprised of a block 30 of closed cell plastic foam covered by an oil based vinyl coating that forms a skin 32 about the block 30. The block 30 is of oblong configuration about one and one half inches in length, about one and three eighths inches in width and about three quarters of an inch in thickness. To construct the float 26 the block 30 is cut from a larger quantity of closed cell foam, such as ethylene vinyl acetate. The block 30 is formed with a pair of parallel holes 28 and 29 each about three sixteenths of an inch in diameter and spaced apart a distance of about one and three quarter inches. The closed cell foam block 30 is dipped in a molten vat of oil based vinyl. When the molten vinyl cools it forms a water impervious skin 32 about the entire exposed surface of the block 30, including the walls of the openings 28 and 29.

A float 26 constructed in the foregoing manner meets the approval of U.S. Coast Guard regulations relative to floating materials for water safety. The float 26 has a buoyancy of at least about two ounces, so that the eyeglasses 12 which typically weigh about two ounces will not sink if they accidentally fall into the water 14.

The tubing 16 is formed of either neoprene or rubber and has a one quarter inch outer diameter and a one eighth inch inner diameter. The ends 18 and 20 of the tube 16 are resilient so that the ends of the bows 22 can be inserted into the tube ends 18 and 20. The bows 22 spread the openings in the tube ends 18 and 20 so that the bows are tightly gripped by the resilient material of which the tube 16 is formed. Also, the hollow structure and resilient nature of the tube 16 allow the tube 16 to pass through the openings 28 and 29 even though the nominal outer diameter of the tube 16 is greater than the diameter of the openings 28 and 29.

By threading the tube 16 through the openings 28 and 29 in the block 26 a loop 34 is formed between the openings 28 and 29. Because the eyeglasses 12 are denser than the water 14, they will tend to sink in the water, but will be held suspended close beneath the float 26 and just below the surface of the water 14 due to the buoyancy of the float 26. The loop 34, which is located on the top side of the float 26 opposite the eyeglasses 12, will project upwardly so that it can be hooked or snagged with some implement from a considerable height above the surface of the water 14 to facilitate the retrieval of the eyeglasses 12.

The vinyl skin 32 of the float 26 is colored a bright yellow, so that it can be seen from a considerable distance on top of the water 14, even if the surface of the body of water 14 is disturbed by wind, waves or foam. Thus, even if the eyeglasses 12 should inadvertently fall from the head of the wearer, the floating eyeglass retainer 10 will prevent them from sinking in a body of water 14, but will hold them near the surface thereof. The eyeglasses 12 can then be easily retrieved by seizing the loop 34 atop the float 26.

To employ the floating eyeglass retainer 10 for use, the elongated, hollow, water impervious, resilient flexible tube 16 is threaded through the pair of openings 28 and 29 defined in the block 30. The float 26 has a buoyancy in water greater than the weight of the eyeglasses 12. To attach the floating eyeglass retainer 10 to the eyeglasses 12, the ends 18 and 20 of the tube 16 are then inserted onto the bows 22. The ends 18 and 20 are elastically deformable to grip the bows 32, and the tube 16 forms a loop 34 between the openings 28 and 29. The tube 16 will be gripped by the structure of the float 26 so that the length of the loop 34 can be adjusted as desired by the user. The loop 34 forms a convenient handle or grip for retrieving the eyeglasses 12 from the body of water 14.

The construction of the floating eyeglass retainer 10 has an additional advantage in that the loop 34 may be lengthened or shortened, as desired by the wearer, to render the floating eyeglass retainer 10 comfortable while the eyeglasses 12 remain in position on the face of the wearer. The float 26 can be longitudinally adjusted along the ends 18 and 20 of the tube 16 to increase or decrease the tension on the eyeglass bows 22 when the eyeglasses 12 are worn on the face of the user. The float 26, when worn by a wearer can be readily adjusted to bear against the rear of the wearer's head with a firm, but not uncomfortable force in order to prevent the eyeglasses 12 from leaving the face of the wearer.

Undoubtedly, numerous variations and modifications of the invention will become readily apparent to those familiar with eyeglass retainer systems. Accordingly, the scope of the invention should not be construed as limited to the specific embodiment of the floating eyeglass retainer illustrated and the specific manner of implementation of the method of preventing the eyeglasses from sinking described herein, but rather is defined in the claims appended hereto.

What is claimed is:

1. A floating eyeglass retainer for holding eyeglasses afloat comprising: an elongated, water impervious, resilient hollow flexible tube of annular cross-sectional configuration and having a first nominal outer diameter and having open ends adapted to be resiliently deformed for insertion over the bows of a frame for said eyeglasses, and a float colored to contrast markedly with a body of water and defining a pair of circular openings having a second nominal diameter which is less than said first nominal diameter through which said tube extends to thereby capture said tube and frictionally engage said tube so that said open ends of said tube reside on one side of said float for releasable attachment to bows of a frame for eyeglasses and so that an intermediate portion of said tube forms a loop between said openings on a side of said float opposite said one side and wherein said float has a buoyancy in water sufficient to overcome the weight of said eyeglasses and to remain afloat.

2. An eyeglass retainer according to claim 1 wherein said float is comprised of a block of closed cell plastic foam covered by an oil based vinyl coating.

3. An eyeglass retainer according to claim 2 wherein said float is formed in the shape of an oblong block about two and one half inches in length, about one and three eighths inches in width and about three quarters of an inch in thickness.

4. An eyeglass retainer according to claim 3 wherein said tube is comprised of neoprene.

5. An eyeglass retainer according to claim 4 wherein said tube has an outer diameter of about one quarter of an inch an inner diameter of about one eighth of an inch, and said openings are each about three sixteenths of an inch in diameter.

6. A combination comprising: an elongated, water impervious, resilient hollow tube of annular cross-sectional configuration and having a first nominal outer diameter and having ends which are elastically deformable to serve as sleeves to fit over the ends of the bows of a frame for eyeglasses to thereby releasably attach said eyeglasses to said tube, and a block colored to contrast markedly with a body of water and defining a pair of circular openings therethrough having a second nominal diameter which is less than said first nominal diameter and through which said tube is threaded in frictional engagement by said block and so that said ends of said tube reside on one side of said block for releasable attachment to bows of a frame for eyeglasses and so than an intermediate portion of said tube forms a loop between said holes on a side of said block opposite said one side and wherein said block has a buoyancy in water sufficient to float when said eyeglasses are attached to said tube and immersed in water.

7. A combination according to claim 6 wherein said block is comprised of a closed cell plastic foam.

8. A combination according to claim 7 wherein said block is covered with a water impervious skin.

9. A combination according to claim 8 wherein said skin is a vinyl coating.

10. A combination according to claim 7 wherein said block has a buoyancy of at least about two ounces.

11. A combination according to claim 7 wherein said openings through said block are parallel to each other.

12. A method of preventing eyeglasses formed with lenses and with a frame having a pair of bows from sinking in water comprising:
   threading an elongated, hollow, water impervious, resilient flexible tube of annular cross-section having a first nominal outer diameter through a pair of circular openings of a nominal diameter smaller than said first diameter defined in a block smaller than said first diameter defined in a block colored to contrast markedly with a body of water and having a buoyancy in water greater than the weight of said eyeglasses in such a manner as to form a loop for an intermediate portion of said tube on one side of said block and such that said ends of said tube both protrude from a different side of said block, and
   inserting the ends of said tube onto said bows, whereby said ends of said tube are elastically deformed to grip said bows.

13. A method according to claim 12 further comprising hooking said loop and lifting said eyeglasses from water by means of said loop.

* * * * *